US010102032B2

United States Patent
Howe et al.

(10) Patent No.: US 10,102,032 B2
(45) Date of Patent: Oct. 16, 2018

(54) FAST TRANSITIONS FOR MASSIVELY PARALLEL COMPUTING APPLICATIONS

(71) Applicant: Raytheon Company, Waltham, MA (US)

(72) Inventors: Benjamin M. Howe, Plano, TX (US); Jacob L. Sanders, Wylie, TX (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 14/289,852

(22) Filed: May 29, 2014

(65) Prior Publication Data

US 2015/0347131 A1 Dec. 3, 2015

(51) Int. Cl.
*G06F 9/44* (2018.01)
*G06F 9/46* (2006.01)
*G06F 9/48* (2006.01)

(52) U.S. Cl.
CPC ............ *G06F 9/4881* (2013.01); *G06F 9/485* (2013.01)

(58) Field of Classification Search
CPC .... G06F 9/3009; G06F 9/4881; G06F 9/4806; G06F 9/485
See application file for complete search history.

(56) References Cited

U.S. PATENT DOCUMENTS

| | | | |
|---|---|---|---|
| 5,481,719 A * | 1/1996 | Ackerman | G06F 9/4843 712/221 |
| 8,156,493 B2 | 4/2012 | Ellis et al. | |
| 8,209,419 B2 | 6/2012 | Ellis et al. | |
| 8,260,492 B2 | 9/2012 | Stange et al. | |
| 2004/0019744 A1* | 1/2004 | Boucher | 711/132 |
| 2008/0189573 A1 | 8/2008 | Darrington et al. | |
| 2010/0042632 A1 | 2/2010 | Johnson et al. | |
| 2010/0293532 A1 | 11/2010 | Andrade et al. | |
| 2011/0191785 A1* | 8/2011 | Archer | G06F 9/46 719/320 |
| 2011/0283262 A1* | 11/2011 | Ceze et al. | 717/128 |
| 2012/0137164 A1 | 5/2012 | Uhlig et al. | |

(Continued)

FOREIGN PATENT DOCUMENTS

| | | |
|---|---|---|
| EP | 0464566 A2 | 1/1992 |
| EP | 1330900 B1 | 9/2007 |
| EP | 2866144 A1 | 4/2015 |

OTHER PUBLICATIONS

Linux Programmer's Manual—pthread_setcancelstate; archived Mar. 20, 2012; 3 pages.*

(Continued)

*Primary Examiner* — S. Sough
*Assistant Examiner* — Kimberly L Jordan
(74) *Attorney, Agent, or Firm* — Schwegman Lundberg & Woessner, P.A.

(57) ABSTRACT

Embodiments relate to facilitating quick and graceful transitions for massively parallel computing applications. A computer-implemented method for facilitating termination of a plurality of threads of a process is provided. The method maintains information about open communications between one or more of the threads of the process and one or more of other processes. In response to receiving a command to terminate one or more of the threads of the process, the method completes the open communications on behalf of the threads after terminating the threads.

20 Claims, 4 Drawing Sheets

(56) References Cited

U.S. PATENT DOCUMENTS

2016/0092317 A1 3/2016 Akiyama et al.
2017/0344439 A1 11/2017 Howe

OTHER PUBLICATIONS

Stephen Cleary; Detection of Half-Open (Dropped) Connections; May 16, 2009; 19 pages.*
Graham E. Fagg and Jack J. Dongarra; Building and Using a Fault-Tolerant MPI Implementation; Fall 2004; 10 pages.*
Probe and Cancel; MPI-2.2 documentation; Sep. 10, 2009; 5 pages.*
"U.S. Appl. No. 15/166,724, Non Final Office Action dated Nov. 2, 2017", 7 pgs.
"U.S. Appl. No. 15/166,724, Preliminary Amendment dated Jun. 2, 2016", 4 pgs.
"International Application Serial No. PCT/US2017/023989, International Search Report dated Jul. 13, 2017", 5 pgs.
"International Application Serial No. PCT/US2017/023989, Written Opinion dated Jul. 13, 2017", 10 pgs.
Howe, Ben, "System and Method for Input Data Fault Recovery in a Massively Parallel Realtime Computing System", Raytheon Proprietary, (Aug. 30, 2015), 8 pgs.
Kumar, Arvind, et al., "Fault Tolerance in Real Time Distributed System", International Journal on Computer Science and Engineering. vol. 3 No. 2., (Feb. 2011), 933-939.
Peng, Li, et al., "Deadlock avoidance for streaming computations with filtering", Parallelism in Algorithms and Architectures, ACM, 2 Penn Plaza, Suite 701 New York NY 10121-0701 USA, (Jun. 13, 2010), 243-252.
U.S. Appl. No. 15/166,724, filed May 27, 2016, System and Method for Input Data Fault Recovery in a Massively Parallel Real Time Computing System.
"U.S. Appl. No. 15/166,724, Examiner Interview Summary dated Jan. 18, 2018", 3 pgs.
"U.S. Appl. No. 15/166,724, Response filed Feb. 2, 2018 to Non-Final Office Action dated Nov. 2, 2017", 23 pgs.
"U.S. Appl. No. 15/166,724, Corrected Notice of Allowance dated May 23, 2018", 2 pgs.
"U.S. Appl. No. 15/166,724, Notice of Allowance dated May 10, 2018", 8 pgs.

* cited by examiner

# FAST TRANSITIONS FOR MASSIVELY PARALLEL COMPUTING APPLICATIONS

STATEMENT OF GOVERNMENT INTEREST

This invention was made with Government support under Contract No. N41756-09-C-9809 awarded by the Department of Defense. The Government has certain rights in this invention.

BACKGROUND

The present disclosure relates generally to facilitating transitions for massively parallel computing applications, and more specifically, to a system for fast and graceful completions of incomplete communications between processes of a parallel computing application.

Massively parallel computing applications typically require complicated initialization and shutdown sequences that take a significant amount of time to perform. In realtime environments, such as in a multi-mode radar system, switching from one application or mode to another application or mode takes a large amount of time "in transition." These long transitions reduce the operational capability of the realtime system.

SUMMARY

Embodiments include a computer program product, a method, and a system for facilitating termination of a plurality of threads of a process. According to an embodiment of the present invention, a computer program product for facilitating termination of a plurality of threads of a process is provided. The computer program product comprises a computer readable storage medium having program instructions embodied therewith. The program instructions readable by a processing circuit cause the processing circuit to perform a method. The method maintains information about open communications between one or more of the threads of the process and one or more of other processes. In response to receiving a command to terminate one or more of the threads, the method completes the open communications on behalf of the threads after terminating the threads.

According to another embodiment of the present invention, a computer system for facilitating termination of a plurality of threads of a process is provided. The computer system comprises a memory having computer readable instructions and a processor configured to execute the computer readable instructions. The instructions comprise maintaining information about open communications between one or more of the threads of the process and one or more of other processes. The instructions further comprise completing the open communications on behalf of the threads after terminating the threads, in response to receiving a command to terminate one or more of the threads.

According to a further embodiment of the present invention, a computer-implemented method for facilitating termination of a plurality of threads of a process is provided. The method maintains information about open communications between one or more of the threads of the process and one or more of other processes. In response to receiving a command to terminate one or more of the threads, the method completes the open communications on behalf of the threads after terminating the threads.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features, and advantages of the disclosure are apparent from the following detailed description taken in conjunction with the accompanying drawings in which:

DETAILED DESCRIPTION

A realtime parallel processing system typically includes several computers executing several processes in parallel for processing data in realtime. In some cases, a realtime parallel processing system runs one application for one data type at a time because of restrictions in realtime memory usage or in order to meet throughput requirements for processing data in realtime. Occasionally, a parallel processing system integrates data before initiating a batch processing sequence for running processes of an application in different computers in parallel. Once the parallel processing system has initiated a batch processing, the parallel processing system performs intense computations that heavily utilize both central processing units (CPUs) and input/output (I/O) connections between the processes of the application. In such a scenario, most of the processes of the application are performing similar operations on different sets of data (e.g., single instruction, multiple data (SIMD) instructions). Intermediate calculation results are often shared among the processes by using inter-process communication protocols (e.g., Message Passing Interface (MPI)).

Figure 1:
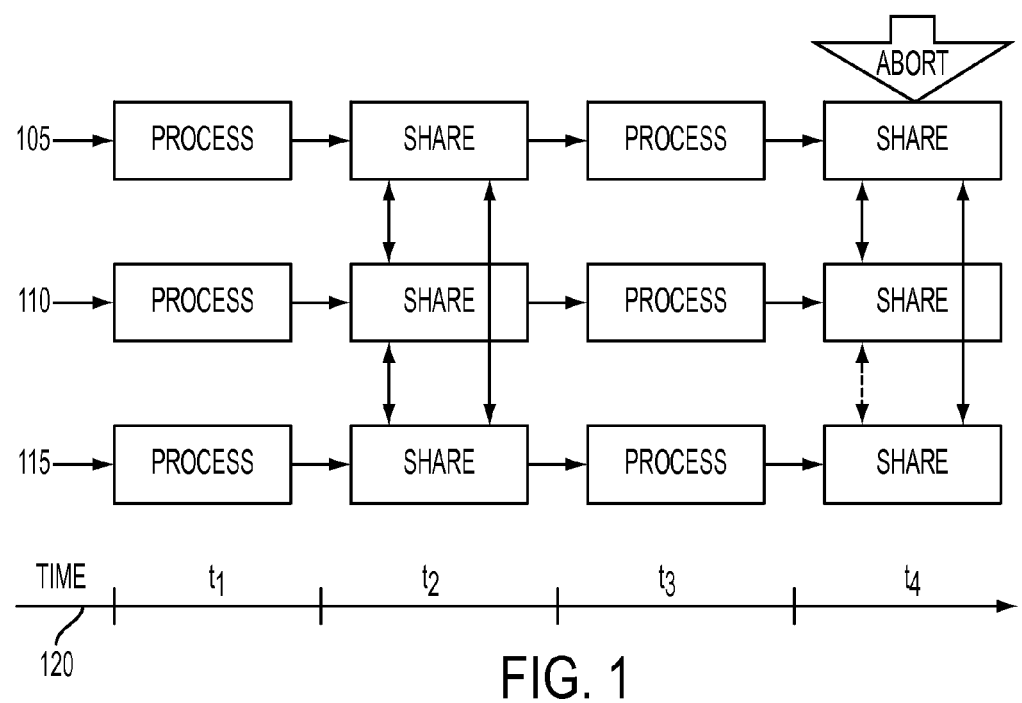
FIG. 1 depicts processing pipelines for several processes of an application running in parallel according to some embodiments of the invention.

FIG. 1 depicts processing pipelines for several processes of an application running in parallel. The processes are of an application that is executed by a parallel processing system. In some cases, the processes are running in different computers. One computer may have one or more processes running. As an example, FIG. 1 shows three processing pipelines 105-115 for three processes of an application running in parallel. Each processing pipeline has four blocks that represent different stages of the pipeline. The time progression is shown as an arrow 120 pointing to the right side of the figure and is divided into time periods $t_1$-$t_4$. The blocks of different processing pipelines in the same time period (i.e., in the same column) represent processing stages being performed in parallel.

During the time period $t_1$, the three processes corresponding to the processing pipelines 105-115 process data in parallel. During the time period $t_2$, the three processes exchange the processing results with each other, as indicated by the bidirectional arrows connecting the "share" blocks in the second column. During the time period $t_3$, the three processes process data in parallel again based on the exchanged data at the previous stage. Typically, processes repeat this intermittent communications in order to exchange data between the processes running in parallel.

In some cases, a process running in a computer may be multi-threaded. That is, the processing performed by each process may be performed by several threads that are also running in parallel. In such cases, the inter-process communications are communications between different threads of different processes. The threads of different processes must all participate in the communication to exchange data because, for example, a thread may hang or wait for a long time when the thread expects to receive data from another thread but never receives when the other thread does not participate in the communication.

When a parallel processing system transitions from a first application to a second application, one option for stopping the first application and starting the second application is to reset the parallel processing system. That is, for example, the parallel processing system is rebooted to unload the first application before the second application can be loaded onto the parallel processing system. This option may not be desirable due to a relatively large amount of application startup time and a large amount of downtime, during which the parallel processing system cannot respond to other requests.

Another option is to send termination or "kill" signals to all the processes of the first application. This option requires that the processes of the second application be spawned after the processes of the first application are terminated. This option may not be desirable, either, because processes for some framework and functionality that could be used by the second application are terminated or corrupted when the first application is terminated.

For example, a parallel processing system switches from one application or mode (e.g., synthetic aperture radar (SAR) application) to another radar application or mode (e.g., moving target indication (MTI)). In a particular computer of the parallel processing system in this example, a SAR process is one set of threads and an MTI process is another set of threads. Both sets of threads interface with common libraries and support utilities (e.g., MPI). These common libraries and support utilities may be used by the second application and therefore it may be desirable to terminate only the SAR threads and spawn MTI threads without terminating the processes for the command libraries and support utilities. Terminating only the SAR threads would minimize the shutdown time for the SAR threads and the startup time for the MTI threads. However, in such an approach, terminating only the SAR threads may leave the system in an unstable state. For example, terminating the threads while the threads are in the middle of an inter-process communication (e.g., SAR communication) with other processes of the parallel processing system may make the inter-process communication utilities (e.g., MPI libraries) unavailable to the new MTI threads after the MTI application starts.

Referring to FIG. 1, during the time period t4, the processes corresponding to the processing pipeline 105-115 are in communication with each other to exchange data. Some of the threads are commanded to terminate in order to load threads of another application in the parallel processing system. The dotted arrow between the processing pipeline 110 and the processing pipeline 115 indicates an inter-process communication (e.g., MPI communication) between the processes corresponding to the processing pipelines 110 and 115 is corrupted or incomplete.

Another approach to gracefully terminate the threads of an application running in different computers is "synchronously" terminating the threads. That is, by configuring the threads of an application running in one computer to periodically check with other processes of the application running in other computers to see if the other processes are ready to abort their processing. By coordinating with other processes, the threads may avoid being deadlocked or corrupted. Once the processes of the first application all agree that they are ready to abort processing, the processes can abort their threads while ensuring that there are no open or incomplete inter-process communications or other shared resources in use. This approach, however, may be computationally very expensive because synchronizing (i.e., exchanging abort status messages—e.g., "Ready to abort now?") too often is a waste of processing time and synchronizing not too often may result in a long termination time between synchronizations. More specifically, when the processes are configured to exchange status messages every 10 seconds, it may take up to 20 seconds for the processes of the application to synchronously decide to abort processing. Moreover, adjusting the frequency of exchanging status messages may not be feasible because of other restrictions (e.g., realtime throughput requirements).

In some embodiments of the invention, systems and methods provide fast and graceful transitions from one application to another application for a parallel processing system by minimizing the time to respond to a termination signal or command without inducing a large overhead for synchronously checking for termination conditions.

Figure 2:
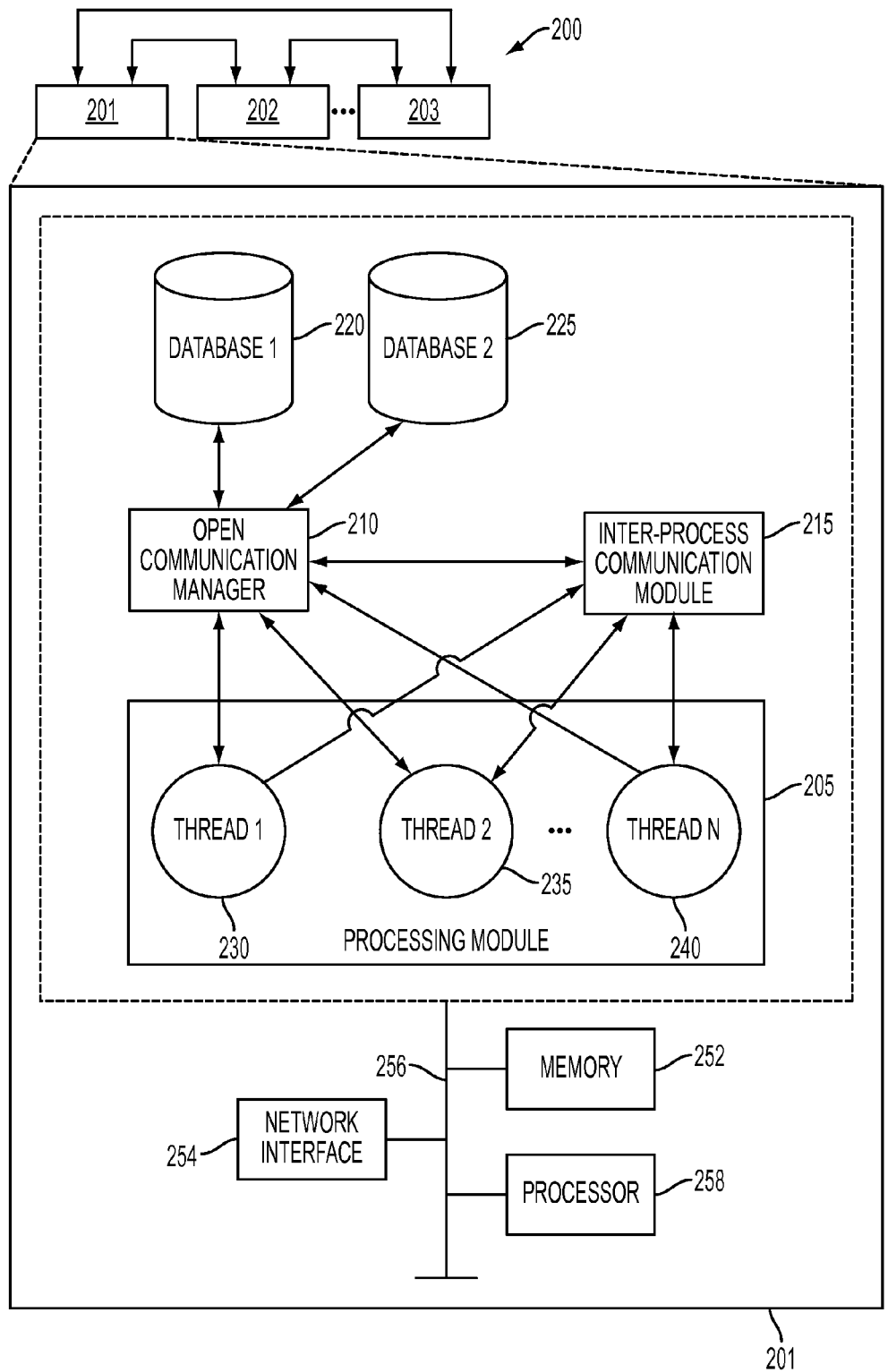
FIG. 2 depicts a block diagram of a computer that runs a process of an application executed by a parallel processing system according to some embodiments of the invention.

FIG. 2 depicts a block diagram of a computer 201 that runs a process of an application executed by a parallel processing system 200 according to exemplary embodiments of the invention. The computer 201 is one of many computers each running at least one process of the application being executed by the parallel processing system 200. In some embodiments, the computer 201 includes a processing module 205, an open communication manager 210, and an inter-process communication module 215, and one or more databases 220 and 225.

The processing module 205 performs a process of the application in the computer 201. As shown, the process being performed by the processing module 205 is in a multi-threaded environment and thus has several threads 230-240. One of these threads, thread 230, is a primary thread that is responsible for starting and shutting down the threads of the process. In some embodiments, the threads 235-240 process data. In some embodiments, the threads 230-240 use the inter-process communication module 215 to communicate with other processes of the application running in other computers (e.g., the computers 202 through 203).

The inter-process communication module 215 supports an inter-process communication protocol such as MPI so that the threads 230-240 can exchange data with other processes running in the other computers 202 through 203 using the inter-process communication module 215. In some embodiments, the inter-process communication module 215 is configured to support MPI.

As discussed above, when a thread of a process is terminated while the thread has an open or incomplete communication with another process, the communication may hang, and it may delay or even halt a transition from one application to another application for a parallel processing system. In some embodiments, the open communication manager 210 facilitates fast and graceful termination of threads of a process. Specifically, the open communication manager 210 tracks all communications between the threads of the computer 201 and other processes running in the other computers 202 through 203. The open communication manager 210 completes the open communications on behalf of the threads when the threads are terminated.

In some embodiments, the open communication manager 210 receives a request from a particular thread of the process run by the processing module 205, and the request indicates that the particular thread has started or opened a communication with another processor in another computer. For instance, the particular thread sends a send message (e.g., MPI_send) to the other process and sends a request to the open communication manager 210, indicating that the thread has an open communication with the other process. The open communication manager 210 stores the information about this communication as an entry in the database 220. Once the communication is completed (e.g., once the particular thread receives an acknowledgement from the other process such as MPI_receive), the particular thread sends another request, which indicates that the particular thread has completed the communication with the other process, to the open communication manager 210. The open communication manager 210 removes the communication information for this request from the database 220. In this manner, the open communication manager 210 maintains information about all open communications between the threads 230 through 240 and other processes running in other computers 202 through 203.

When sending requests to add or remove communication information to the open communication manager 210, the threads 230-240 of some embodiments send the request atomically so that the threads are not terminated while the communication information is being added or removed. This is to ensure that the communication information stored in the database accurately reflects all open communications and none of the completed communications. More specifically, in some embodiments, a thread disables thread termination, initiates or completes a communication, sends the request to add or remove the information about the communication to the open communication manager 210, and then enables thread termination. That is, a thread is programmed to "wrap" a request sending operation with a thread termination disabling operation and a thread termination enabling operation. In these embodiments, a thread may be terminated any time except for when the communication information is being added to or removed from a database.

The communication information about all open communications stored in the database is used when the process executed by the proceeding module 205 is being shutdown to transition from one application to another application. Specifically, when the parallel processing system 200 starts transitioning from one application to another, the primary thread 230 of the process being run by the proceeding module 205 terminates or cancels other threads 235-240 (e.g., by sending a pthread_cancel command). Without the open communication manager 210 and the database 220, any open communications between the threads 235 through 240 and other processors running in other computers may hang or be deadlocked, and the inter-process communication module 215 may become unstable or unusable.

The open communication manager 210 on behalf of the threads that are terminated completes the communication. Specifically, the open communication manager 210 identifies all open communications for the threads by looking up the database 220 and completes the communications. For instance, the open communication manager 210 may send a receive message (e.g., MPI_receive) to the sender process in another computer so that the communication between the thread and the sender process is deemed complete.

In this manner, the open communication manager 210 along with the database 220 makes it possible for the processing module 205 to terminate the threads quickly while avoiding leaving any incomplete communications. Specifically, the open communication manager 210 and the database 220 have all the benefits of asynchronously killing threads, which is fast, while retaining all the stability of the synchronous abort checking (e.g., maintaining MPI and system support services functionality).

Some MPI implementations may have support for "eager" sends. Unlike for other MPI send operation, a sender process that initiates a send operation with an eager send does not have to wait for an acknowledgement from the receiver process that the receiver has initiated a receive operation to take data from the sender process. That is, the communication is deemed completed for the sender processor as soon as an eager send message is sent to the receiver processor. An eager send is useful in that it allows the sender process to go on processing other data without waiting for an acknowledgment from the receiver process. An eager send, however, complicates communication between the sender and receiver processes because a submission of an eager send by a sender thread does not necessarily mean that the data has been received by the receiver side. Therefore, terminating a sender thread before the receiver process initiates or completes a receive operation puts the MPI utilities in an unstable state.

In some embodiments, the inter-process communication module 210 supports eager sends, and thus may have the above-described issues associated with eager sends. To address these issues, the open communication manager 210 of some embodiments maintains information about all candidate eager sends made by the threads of the processing module 205. In some embodiments, the open communication managers 210 maintains the communication information about the candidate eager sends in the database 225, separately from the communication information about non-eager sends stored in a database 225. In these embodiments, the open communication manager 210 determines whether a request to add or remove communication information received from a thread is about an eager send. The open communication manager 210 may determine whether a request may be about an eager send based on a length of the message being sent by the thread because the message length of an eager send is shorter than a specified threshold length.

In some embodiments, the open communication manager 210 assumes that all sends are eager sends and places all sends as candidate eager sends in the database 225. In some embodiments, the database 225 is a circular buffer storing entries for the last N sends, where N is a number determined heuristically. That is, the candidate eager sends remain in the database 225 only for a period of time that corresponds to N because the receiving processes are assumed to have performed receive operations when the period of time elapses.

When the threads are terminated, the open communication manager 210 goes through the database 225 to identify all candidate eager send communications. The open communication manager 210 determines whether a candidate eager send communication is incomplete by checking whether the receiver process has performed a receive operation (e.g., by performing an MPI_receive). In some embodiments, the open communication manager 210 checks whether the receiver process has performed a receive operation by calling MPI_Iprobe on the candidate eager send. If the candidate eager send communication is determined to be incomplete, the open communication manager 210 completes the communication.

In some embodiments, the open communication manager 210 may access databases managed by other open communication managers (not shown) running in other computers 202 through 203 to get the open communication information in the other computers, in order to facilitate completion of the open communications between the threads of the computer 201 and processes of the other computers. For instance, the open communication manager 210 may go to databases of another computer storing all eager sends sent out by processes in those computers to the computer 201. The open communication manager 210 completes the communications by initiating receive operations on behalf of the threads that are supposed to receive data from the processes in other computers. In these embodiments, the other communication managers running in other computers 202 through 203 may also access the databases 220 and 225.

In some embodiments, the open communication manager 210 is a library, like the inter-process communication module 215 is. That is, the threads 230-240 are programmed to make calls defined in this library in order to request that the communication information be added or removed from the database 220 or 225. In some embodiments, the databases 220 and 225 are implemented in a memory shared by the threads 230 and 240. In some embodiments, the open communication manager 210 is a stand-alone module that is separate from the processing module 205. In other embodiments, the open communication manager 210 may be a thread (e.g., the primary thread 230) run by the processing module 205 and is responsible for maintaining the open communications of other threads and completing open communications on behalf of other threads.

As used herein, the terms module and sub-module may refer to an application specific integrated circuit, an electronic circuit, a processor (shared, dedicated, or group) and memory that executes one or more software or firmware programs or a combinational logic circuit in a system. For example, in some embodiments, the modules 205, 210 and 215 may be communicatively connected (e.g., through a bus 256) to a memory 252 that may include the databases 220 and 225 to store and retrieve the communication information. The modules 205, 210 and 215 may also use a processor 258 to perform their operations. The modules 205, 210 and 215 may also be communicatively connected to a network interface 254 to exchange data with other processes running in the computers 202 through 203. In some embodiments, the modules 205, 210 and 215 may be combined or further partitioned.

In some cases, threads of a process perform communications into their own stacks. That is, for a thread, the data to be sent out to another process and the data received from other processes are stored in the stack of the thread. Cleanup handlers perform any necessary cleanup after the thread is terminated. The data being sent out or received from other processes during the completion of the open communications by the open communication manager 210 on behalf of the thread is also placed in the stack of the thread. However, this data placed in the stack as part of communication completion may also interfere with the operation of the cleanup handlers for the thread if, for example, data arrives in the stack while the cleanup handlers are utilizing the stack. This may result in an undesirable behavior of the inter-process communication module 215.

In order to prevent data being placed in the stack of a thread as part of communication completion from interfering with a cleanup handler, a thread of some embodiments is configured to reserve a space in the stack for the cleanup handler. In some embodiments, this reserved stack space is placed at the beginning of the thread's stack by placing the stack pointer to the end of the reserved space when the thread is initially spawned. In this manner, the incoming data that is part of a communication completion is prevented from interfering with the stack space required for the cleanup handler when the thread is terminating.

Figure 3:
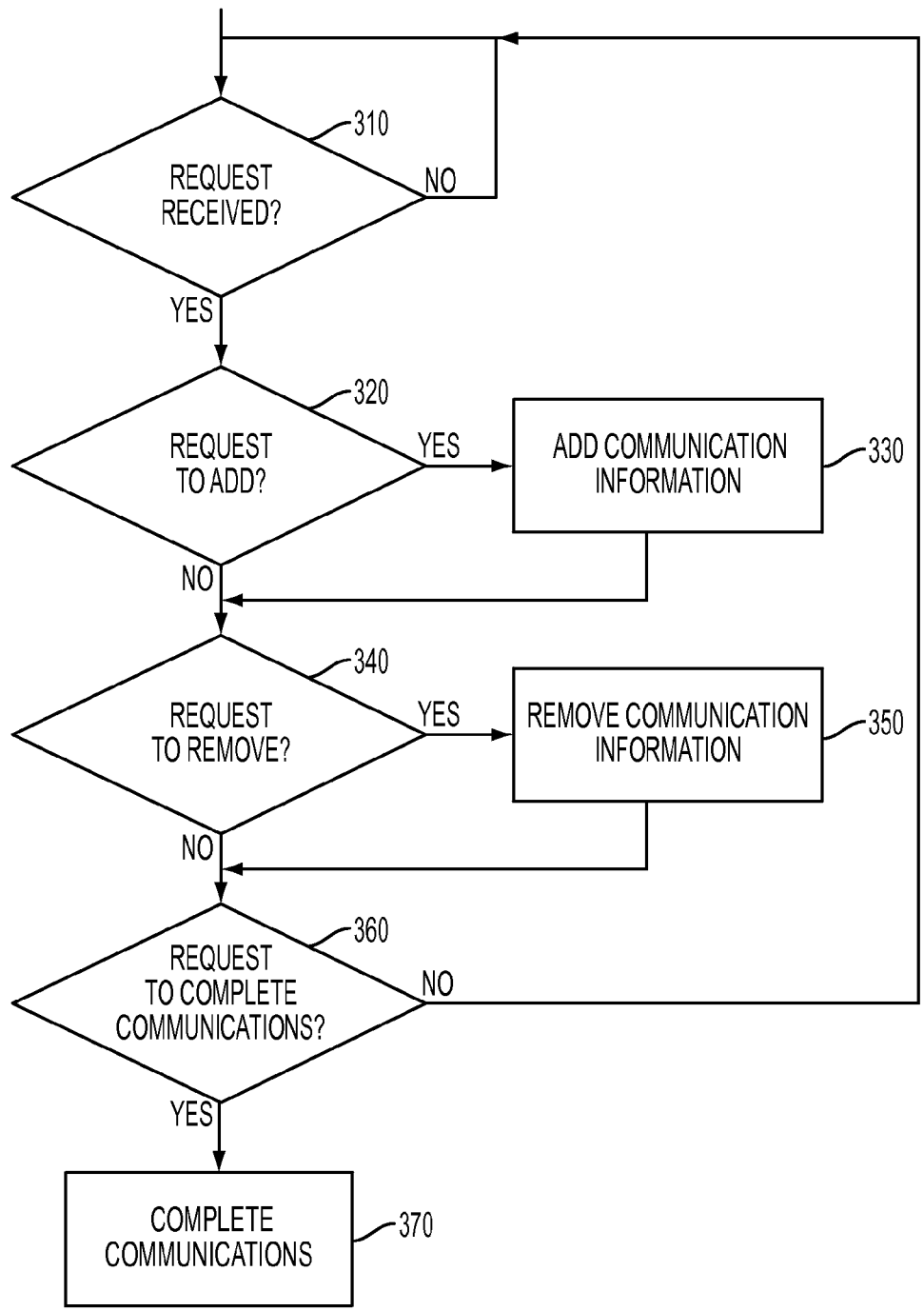
FIG. 3 depicts a processing flow for managing open communications between threads of a process running in a computer and other processes running in one or more other computers according to some embodiments of the invention.

FIG. 3 depicts a processing flow for managing open communications between threads of a process running in a computer and other processes running in one or more other computers. In some embodiments, the processing flow shown in FIG. 3 is performed by the open communication manager 210 shown in FIG. 2.

At block 310, the open communication manager 210 determines whether a request from a thread of the process is received. The open communication manager 210 loops at block 310 until a request is received from one of the threads of the process.

When the open communication manager 210 determines at block 310 that a request has been received, the open communication manager 210 determines at block 320 whether the received request is a request to add communication information to a database. The communication information included in a request to add indicates that the thread has opened a communication with another processor in another computer. Based on determining at block 320 that the received request is a request to add communication information, the open communication manager 210 adds at block 330 the communication information about the opened communication. At block 320, the open communication manager 210 of some embodiments optionally adds communication information about all send messages to the database 225 under an assumption that all send messages are candidate eager sends.

Based on determining at block 320 that the request is not a request to add communication information, the open communication manager 210 determines at block 340 whether the received request is a request to remove communication information from a database. The communication information included in a request to remove indicates that the thread has completed communication with another process in another computer. Based on determining at block 340 that the received request is a request to remove communication information, the open communication manager 210 identifies at block 350 the communication information associated with the request and removes the information from the database 220 or 225.

Based on determining at block 340 that the request is not a request to remove communication information, the open communication manager 210 determines at block 360 whether the received request is a request to complete all open communications on behalf of the threads being terminated. The primary thread 230 of the example described above by reference to FIG. 2 sends a request to complete all open communications when the parallel processing system 200 initiates a transition from the current application being run to another application to load that application. That is, the primary thread 230 sends a request to complete all open or incomplete communications after the primary thread 230 terminates other threads 235 through 240.

Based on determining at block 360 that the request is not a request to complete all open communications, the open communication manager 210 loops back to block 310 to receive another request from a thread. Otherwise, the open communication manager 210 at block 370 completes the all open communications on behalf of the threads having open communications and being terminated. For instance, when an open communication is about a send message (e.g., MPI_send) received by the thread, the open communication manager 210 initiates a receive operation (e.g., by sending MPI_receive) to complete the communication. When an open communication is about a receive message (e.g., MPI_recv) sent to this process from another process, the open communication manager 210 initiates a send message to complete the communication. In some embodiments, the open communication manager 210 also checks a receive queue (e.g., via MPI_Iprobe) to see if there are candidate eager sends that the process running in the computer 201 has received. For those eager sends received from other processes in other computers, the open communication manager 210 completes the communication by receiving data from the processes or removing the received eager sends from the receive queue.

Figure 4:
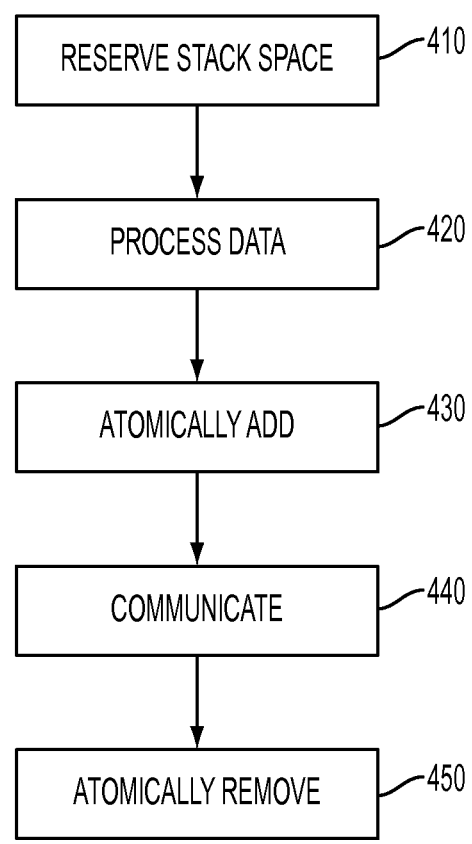
FIG. 4 depicts a processing flow for operations of a thread of a process, which is one of a plurality of processes of an application being run in parallel by a parallel processing system according to some embodiments of the invention.

FIG. 4 depicts a processing flow for operations of a thread of a process, which is one of a plurality of processes of an application being run in parallel by a parallel processing system. In some embodiments, the processing flow shown in FIG. 4 is performed by one of the threads 235 through 240 shown in FIG. 2. At block 410, the thread reserves a space in its own stack. The thread moves the pointer to the stack at the end of the reserved space. When the thread is being terminated, the stack pointer moves back into the reserved space so that the cleanup handler only accesses the reserved space so that the thread may use the rest of the stack for communications without interfering with the cleanup handler.

At block 420, the thread processes data. At block 430, when the thread needs to send the processed data to another process or when the thread needs to receive some data from another process, the thread initiates a communication with another process. Specifically, the thread of some embodiments atomically sends a request to the open communication manager 210 to add communication information to the database 220 or 225. That is, the thread is configured to disable thread termination for the thread so that the thread is not terminated while the thread is sending a request or while the communication information is being added to the database. Once the thread termination is disabled, the thread sends the request to the open communication manager 210. The thread then enables the thread termination for the thread so that the thread can be terminated when necessary.

At block 440, the thread communicates with another process in order to exchange data with the other process. For instance, the thread may initiate a send operation to the other process. The thread finishes or completes the communication with the other process, for example, by receiving an acknowledgement from the other process that the other process is ready to receive the data.

At block 450, since the communication is completed, the thread atomically sends a request to the open communication manager 210 to remove the information about the communication between the thread and the other process. That is, the thread is configured to disable thread termination for the thread so that the thread is not terminated while the thread is sending a request or while the information about the communication is being removed from the database. Once the thread termination is disabled, the thread sends the request to the open communication manager 210. The thread then enables the thread termination for the thread so that the thread can be terminated when necessary.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product for facilitating termination of a plurality of threads of a process, the computer program product comprising:
   a computer readable storage medium having program instructions embodied therewith, the program instructions readable by a processing circuit to cause the processing circuit to perform a method comprising:
   maintaining information about open communications between one or more of the threads of the process and one or more of other processes;
   receiving a command to terminate one or more of, but fewer than all of, the threads of the process; and
   in response to receiving the command to terminate one or more of, but fewer than all of, the threads of the process, terminating the one or more of, but fewer than all of, the threads of the process and completing the open communications on behalf of the terminated threads after terminating the one or more but fewer than all of the threads.

2. The computer program product of claim 1, wherein the maintaining comprises storing the information in a memory shared by the threads.

3. The computer program product of claim 2, wherein the maintaining further comprises:
   receiving, from a particular thread of the plurality of threads, a request to add information about an open communication between the particular thread and another process;
   in response to receiving the request adding the information about the open communication to the memory;
   receiving a request to remove the information about the open communication from the particular thread; and
   in response to receiving the request to remove, removing the information about the open communication from the memory.

4. The computer program product of claim 3, wherein the particular thread atomically sends each request.

5. The computer program product of claim 4, wherein the particular thread atomically sends the request by:
   disabling thread termination for the particular thread;
   initiating or completing the communication;
   sending the request; and
   enabling thread termination for the particular thread.

6. The computer program product of claim 3, wherein the method further comprises:
   determining whether the open communication is about a send message; and
   based on determining that the open communication is about a send message, adding the information about the open communication to the memory as a candidate eager send.

7. The computer program product of claim 3, wherein the particular thread reserves a space in a stack of the particular thread for a cleanup handler in order to prevent the data resulting from completing the open communication from interfering with the cleanup handler.

8. A computer system for facilitating termination of a plurality of threads of a process:
   a memory having computer readable instructions; and
   a processor configured to execute the computer readable instructions, the instructions comprising:

maintaining, by a computer, information about open communications between one or more of the threads of the process and one or more of other processes;

receiving a command to terminate one or more of, but fewer than all of, the threads of the process; and in response to receiving the command to terminate one or more of, but fewer than all of, the threads of the process, terminating the one or more of, but fewer than all of, the threads of the process and completing the open communications on behalf of the terminated threads after terminating the one or more but fewer than all of the threads.

9. The computer system of claim 8, wherein the maintaining comprises storing the information in the memory shared by the threads.

10. The computer system of claim 9, wherein the maintaining further comprises:

receiving, from a particular thread of the plurality of threads, a request to add information about an open communication between the particular thread and another process;

in response to receiving the request, adding the information about the open communication to the memory;

receiving a request to remove the information about the open communication from the particular thread; and in response to receiving the request to remove, removing the information about the open communication from the memory.

11. The computer system of claim 10, wherein the particular thread atomically sends each request.

12. The computer system of claim 11, wherein the particular thread atomically sends the request by:

disabling thread termination for the particular thread;
initiating or completing the communication;
sending the request; and
enabling thread termination for the particular thread.

13. The computer system of claim 10, wherein the instructions further comprise:

determining whether the open communication is about a send message; and based on determining that the open communication is about a send message, adding the information about the open communication to the memory as a candidate eager send.

14. The computer system of claim 10, wherein the particular thread reserves a space in a stack of the particular thread for a cleanup handler in order to prevent the data resulting from completing the open communication from interfering with the cleanup handler.

15. A computer-implemented method for facilitating termination of a plurality of threads of a process, the method comprising:

maintaining, by a computer, information about open communications between one or more of the threads of the process and one or more of other processes;

receiving a command to terminate one or more of, but fewer than all of, the threads of the process; and in response to receiving the command to terminate one or more of, but fewer than all of, the threads of the process, terminating the one or more of, but fewer than all of, the threads of the process and completing the open communications on behalf of the terminated threads after terminating the one or more but fewer than all of the threads.

16. The method of claim 15, wherein the maintaining comprises storing the information in a memory shared by the threads.

17. The method of claim 16, wherein the maintaining further comprises:

receiving, from a particular thread of the plurality of threads, a request to add information about an open communication between the particular thread and another process;

in response to receiving the request, adding the information about the open communication to the memory;

receiving a request to remove the information about the open communication from the particular thread; and in response to receiving the request to remove, removing the information about the open communication from the memory.

18. The method of claim 17, wherein the particular thread atomically sends each request.

19. The method of claim 18, wherein the particular thread atomically sends the request by:

disabling thread termination for the particular thread;
initiating or completing the communication;
sending the request; and
enabling thread termination for the particular thread.

20. The method of claim 17 further comprising:

determining whether the open communication is about a send message; and based on determining that the open communication is about a send message, adding the information about the open communication to the memory as a candidate eager send.

* * * * *

UNITED STATES PATENT AND TRADEMARK OFFICE
CERTIFICATE OF CORRECTION

PATENT NO. : 10,102,032 B2
APPLICATION NO. : 14/289852
DATED : October 16, 2018
INVENTOR(S) : Howe et al.

Page 1 of 1

It is certified that error appears in the above-identified patent and that said Letters Patent is hereby corrected as shown below:

In the Specification

In Column 3, Line 58, delete "t4," and insert --$t_4$,-- therefor

In Column 5, Line 49, delete "proceeding" and insert --processing-- therefor

In Column 5, Line 53, delete "proceeding" and insert --processing-- therefor

In Column 6, Line 31, delete "210" and insert --215-- therefor

Signed and Sealed this
Nineteenth Day of January, 2021

Andrei Iancu
*Director of the United States Patent and Trademark Office*